United States Patent
Hosokawa et al.

(10) Patent No.: US 11,530,337 B2
(45) Date of Patent: *Dec. 20, 2022

(54) OPTICALLY TRANSPARENT PRESSURE-SENSITIVE ADHESIVE SHEET, LAMINATE, PROCESS FOR PRODUCING LAMINATE, AND DISPLAY DEVICE WITH TOUCH PANEL

(71) Applicant: BANDO CHEMICAL INDUSTRIES, LTD., Hyogo (JP)

(72) Inventors: Yuki Hosokawa, Hyogo (JP); Jun Onishi, Hyogo (JP); Soichiro Nakane, Hyogo (JP)

(73) Assignee: BANDO CHEMICAL INDUSTRIES, LTD., Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/763,839

(22) PCT Filed: Sep. 26, 2016

(86) PCT No.: PCT/JP2016/078213
§ 371 (c)(1),
(2) Date: Mar. 28, 2018

(87) PCT Pub. No.: WO2017/057245
PCT Pub. Date: Apr. 6, 2017

(65) Prior Publication Data
US 2018/0282586 A1 Oct. 4, 2018

(30) Foreign Application Priority Data
Sep. 29, 2015 (JP) .............................. JP2015-191922

(51) Int. Cl.
| | | |
|---|---|---|
| *C08G 71/00* | (2006.01) | |
| *C09J 7/10* | (2018.01) | |
| *C09J 175/04* | (2006.01) | |
| *C08G 18/80* | (2006.01) | |
| *C08G 18/48* | (2006.01) | |
| *C08G 18/62* | (2006.01) | |
| *B32B 27/40* | (2006.01) | |
| *B32B 27/00* | (2006.01) | |
| *C08G 18/75* | (2006.01) | |
| *C09J 7/35* | (2018.01) | |
| *C08G 18/24* | (2006.01) | |
| *C08G 18/44* | (2006.01) | |
| *C08G 18/73* | (2006.01) | |
| *G06F 3/041* | (2006.01) | |

(52) U.S. Cl.
CPC .............. *C09J 7/10* (2018.01); *B32B 27/00* (2013.01); *B32B 27/40* (2013.01); *C08G 18/246* (2013.01); *C08G 18/44* (2013.01); *C08G 18/48* (2013.01); *C08G 18/4825* (2013.01); *C08G 18/4833* (2013.01); *C08G 18/6204* (2013.01); *C08G 18/6208* (2013.01); *C08G 18/73* (2013.01); *C08G 18/755* (2013.01); *C08G 18/8016* (2013.01); *C09J 7/35* (2018.01); *C09J 175/04* (2013.01); *G06F 3/041* (2013.01); *C08G 2170/20* (2013.01); *C08G 2170/40* (2013.01); *C09J 2203/318* (2013.01); *C09J 2475/00* (2013.01); *Y10T 428/2896* (2015.01)

(58) Field of Classification Search
None
See application file for complete search history.

(56) References Cited

U.S. PATENT DOCUMENTS

| | | | | |
|---|---|---|---|---|
| 3,914,484 A | * | 10/1975 | Creegan ..................... | C09J 7/21 428/41.5 |
| 4,025,579 A | | 5/1977 | Gruber et al. | |
| 4,705,721 A | * | 11/1987 | Frisch ................. | B32B 17/1077 428/349 |
| 5,252,155 A | | 10/1993 | Nowicki et al. | |
| 5,486,570 A | | 1/1996 | St. Clair | |
| 5,646,229 A | * | 7/1997 | Kudo ..................... | C08G 18/10 528/44 |

(Continued)

FOREIGN PATENT DOCUMENTS

| | | |
|---|---|---|
| CA | 2696968 | 2/2009 |
| CN | 1037523 | 11/1989 |

(Continued)

OTHER PUBLICATIONS

Iguchi, Daichi et al., abstract of JP 2013-018856 A, published Jan. 31, 2013. (Year: 2013).*

(Continued)

*Primary Examiner* — Anish P Desai
(74) *Attorney, Agent, or Firm* — JCIPRNET

(57) ABSTRACT

The present invention provides an optically clear adhesive sheet using a heat-curable polyurethane composition, wherein the optically clear adhesive sheet can, when bonded to an adherend such as a glass plate, prevent the occurrence of air bubbles even at high temperature and normal humidity and maintain a stable bonded interface. The optically clear adhesive sheet of the present invention is an optically clear adhesive sheet containing: a cured product of a heat-curable polyurethane composition, the heat-curable polyurethane composition containing a polyol component and a polyisocyanate component, the polyol component having an olefin skeleton, the polyisocyanate component containing an acyclic aliphatic polyisocyanate and/or an alicyclic polyisocyanate.

7 Claims, 2 Drawing Sheets

(56) References Cited

U.S. PATENT DOCUMENTS

| | | | |
|---|---|---|---|
| 7,070,862 | B1 | 7/2006 | Miyakawa et al. |
| 2006/0022309 | A1 | 2/2006 | Tokunaga et al. |
| 2008/0280074 | A1 | 11/2008 | Sugino et al. |
| 2010/0040842 | A1 | 2/2010 | Everaerts et al. |
| 2010/0216905 | A1 | 8/2010 | Kuwamura et al. |
| 2011/0003146 | A1* | 1/2011 | Qiu .................. C08G 18/1808 428/355 N |
| 2012/0000603 | A1* | 1/2012 | Karafilidis ......... C08G 18/5021 156/331.7 |
| 2013/0115405 | A1* | 5/2013 | Kinzelmann ............ B32B 7/12 428/57 |
| 2014/0017467 | A1 | 1/2014 | Inao et al. |
| 2014/0329927 | A1 | 11/2014 | Ha et al. |
| 2018/0112112 | A1* | 4/2018 | Onishi ....................... C09J 7/00 |
| 2018/0282586 | A1 | 10/2018 | Hosokawa et al. |
| 2018/0354229 | A1 | 12/2018 | Onishi et al. |
| 2019/0039363 | A1 | 2/2019 | Nakane et al. |
| 2019/0048234 | A1 | 2/2019 | Nakane et al. |
| 2019/0194498 | A1 | 6/2019 | Takagi et al. |

FOREIGN PATENT DOCUMENTS

| | | |
|---|---|---|
| CN | 1726250 | 1/2006 |
| CN | 101784593 | 7/2010 |
| CN | 103314068 | 9/2013 |
| CN | 104093800 | 10/2014 |
| CN | 108292178 | 7/2018 |
| EP | 1864655 | 12/2007 |
| EP | 3296373 | 3/2018 |
| EP | 3357985 | 8/2018 |
| EP | 3382517 | 10/2018 |
| EP | 3412740 | 12/2018 |
| JP | 09-183963 | 7/1997 |
| JP | H09183963 | 7/1997 |
| JP | H11263961 | 9/1999 |
| JP | 2011074333 | 4/2011 |
| JP | 2012-021104 | 2/2012 |
| JP | 2012-21104 | 2/2012 |
| JP | 2012121978 | 6/2012 |
| JP | 2013-018856 | 1/2013 |
| JP | 2013018856 | 1/2013 |
| JP | 2013018871 | 1/2013 |
| JP | 2013116942 | 6/2013 |
| JP | 2013-136731 | 7/2013 |
| JP | 2013-213159 | 10/2013 |
| JP | 2013212694 | 10/2013 |
| JP | 2014148078 | 8/2014 |
| JP | 2014148081 | 8/2014 |
| JP | 2014152198 | 8/2014 |
| JP | 2014196442 | 10/2014 |
| JP | 2015030766 | 2/2015 |
| JP | 2015040240 | 3/2015 |
| JP | 2015083381 | 4/2015 |
| JP | 2015120819 | 7/2015 |
| JP | 2015160905 | 9/2015 |
| JP | 2015189852 | 11/2015 |
| JP | 2015208898 | 11/2015 |
| JP | 2015209538 | 11/2015 |
| JP | 2016141687 | 8/2016 |
| JP | 2016141688 | 8/2016 |
| JP | 5987135 | 9/2016 |
| JP | 2017008193 | 1/2017 |
| JP | 2014142192 | 2/2017 |
| KR | 20070110433 | 11/2007 |
| KR | 1020140029254 | 3/2014 |
| NL | 7511615 | 4/1976 |
| TW | 200927779 | 7/2009 |
| WO | 2004052970 | 6/2004 |
| WO | 2011158839 | 12/2011 |
| WO | 2012132520 | 10/2012 |
| WO | 2013088889 | 6/2013 |
| WO | 2013115250 | 8/2013 |
| WO | 2013161812 | 10/2013 |
| WO | 2014142192 | 9/2014 |
| WO | 2015016106 | 2/2015 |
| WO | 2015190558 | 12/2015 |
| WO | 2016181857 | 11/2016 |

OTHER PUBLICATIONS

Higuchi, Daichi et al., English translation of JP 2013-018856 A, published Jan. 31, 2013. (Year: 2013).*

Higuchi, Daichi et al., "Two-Liquid Hardening Polyurethane Resin Composition And Adhesive Film Obtained By The Same", English translation of JP 2013-018856A, Jan. 31, 2013. (Year: 2013).*

Yuji,, Nakajima et al., "Polyurethane Resin-Forming Composition For Optical Component", English translation of JP 2013-136731 A, Jul. 11, 2013 (Year: 2013).*

So Ra, "Thermosetting Adhesive Composition And Adhesive Layer", English translation of JP2017-008193 A, Jan. 12, 2017 (Year: 2017).*

"International Search Report (Form PCT/ISA/210)" of PCT/JP2016/078213, dated Oct. 25, 2016, with English translation thereof, pp. 1-4.

"Decision on Opposition of Japan Related Application," issued on Oct. 8, 2019, with partial English translation thereof, p. 1-p. 39.

"Notification of Reasons for Revocation of Japan Related Application," dated Apr. 25, 2019, with English translation thereof, p. 1-p. 20.

"Response to Notification of Reasons for Revocation of Related Counterpart Application," filed on Jun. 20, 2019, with partial English translation thereof, p. 1-p. 23.

"International Search Report (Form PCT/ISA/210) of PCT/JP2017/029447," dated Oct. 24, 2017, with English translation thereof, pp. 1-3.

"Notification of Reasons for Refusal of Japan Related Application," dated Nov. 14, 2017, with English translation thereof, p. 1-p. 4.

"International Search Report (Form PCT/ISA/210) of PCT/JP2016/063355," datedJul. 12, 2016, with English translation thereof, pp. 1-4.

"International Search Report (Form PCT/ISA/210)" of PCT/JP2016/083674, dated Dec. 20, 2016, with English translation thereof, pp. 1-4.

"International Search Report (Form PCT/ISA/210) of PCT/JP2017/001680", dated Mar. 14, 2017, with English translation thereof, pp. 1-4.

"International Search Report (Form PCT/ISA/210)of PCT/JP2017/001701", dated Mar. 7, 2017, with English translation thereof, pp. 1-6.

* cited by examiner

OPTICALLY TRANSPARENT PRESSURE-SENSITIVE ADHESIVE SHEET, LAMINATE, PROCESS FOR PRODUCING LAMINATE, AND DISPLAY DEVICE WITH TOUCH PANEL

CROSS-REFERENCE TO RELATED APPLICATION

This application is a 371 application of International PCT application serial no. PCT/JP2016/078213, filed on Sep. 26, 2016, which claims the priority benefit of Japan application no. 2015-191922, filed on Sep. 29, 2015. The entirety of each of the above-mentioned patent applications is hereby incorporated by reference herein and made a part of this specification.

TECHNICAL FIELD

The present invention relates to optically clear adhesive sheets, laminates, methods for producing a laminate, and display devices with a touchscreen.

BACKGROUND ART

Optically clear adhesive (OCA) sheets are transparent adhesive sheets used to bond optical members to each other. A recent rapid increase in demand for touchscreens in the fields of smartphones, tablet PCs, handheld game consoles, and automotive navigation systems is accompanied by an increase in demand for OCA sheets used to bond a touchscreen to another optical member. A typical display device with a touchscreen has a structure in which optical members including a display panel (e.g., liquid crystal panel), a transparent member (touchscreen main unit) having on its outer surface a transparent conductive film formed of a material such as indium tin oxide (ITO), and a cover panel that protects the transparent conductive film are stacked, with OCA sheets used to bond these optical members to each other. In between the display panel and the touchscreen main unit, however, is typically an air layer called an air gap but no OCA sheet because there is a gap larger than gaps between the other optical members due to the edge of a bezel, which is the housing of the display panel.

Known OCA sheets include those formed of a silicone resin composition or an acrylic resin composition, for example. OCA sheets formed of silicone resin have low adhesive strength and thus unfortunately allow air to enter a gap between optical members. This may cause problems such as deterioration of the display screen visibility. In OCA sheets formed of acrylic resin, acrylic acid remaining in the acrylic resin or acid components generated through hydrolysis may unfortunately corrode metals used in optical members. In addition, in the case where the acrylic resin composition is a UV-curing resin composition, a thick OCA sheet may be difficult to obtain because free radicals in the acrylic resin, which are necessary in the curing reaction, may be consumed in the outer layer part under UV light, leaving the bottom part uncured.

Patent Literature 1 discloses a technique to deal with these problems, which is to use a polyurethane resin-forming composition containing a modified polyisocyanate and a polyol containing a liquid polycarbonate diol, for OCA sheets.

Also, Patent Literature 2 discloses a urethane-based moisture-curable adhesive composition containing a specific urethane prepolymer having an isocyanate group at a molecular end, a specific olefin-based polyol, and specific adhesion-imparting resins, with an aim of obtaining a moisture-curable adhesive exhibiting improved adhesion to an olefin-based resin or a polyester-based resin.

Patent Literature 3 discloses an OCA sheet including a clear adhesive layer formed from a composition containing a C2-C20 (meth)acrylate monomer, a urethane (meth)acrylate obtained by reaction of a meth(acrylate) having a hydroxy group with a polyisocyanate, a photopolymerization initiator, and a monomer having a carboxyl group. Isophorone diisocyanate is mentioned as an example of the polyisocyanate.

CITATION LIST

Patent Literature

Patent Literature 1: JP 2013-136731 A
Patent Literature 2: JP 2012-21104 A
Patent Literature 3: JP 2013-213159 A

SUMMARY OF INVENTION

Technical Problem

An air gap, which is an air layer, formed between optical members causes interfacial reflection because there are differences in refractive index between the air layer and the optical members. Such interfacial reflection deteriorates visibility of the display panel. This disadvantage has led to a demand for a thick OCA sheet suited to bonding of a display panel and a touchscreen main unit. Also, an OCA sheet used to bond a display panel and a touchscreen main unit is required to conform to an uneven surface on which the thick bezel is present. Accordingly, an OCA sheet has been desired which exhibits excellent flexibility (capability to conform to uneven surfaces) and can be made thick.

The key characteristic for OCA sheets is the adhesive strength which is typically evaluated based on the adhesive strength to glass. OCA sheets are also desired to have physical properties resistant to changes in usage environment.

In studies to solve those problems, the inventors have focused on a solvent-free heat-curable polyurethane composition as a material of an OCA sheet that exhibits excellent flexibility and can be made thick. As a result of studies, the inventors found that in the case of using a polycarbonate-based polyol as a polyol component, which is a material of a heat-curable polyurethane composition, the resulting OCA sheet has excellent environment resistance but is likely to have a problem of air bubbles at the interface with a glass plate when the OCA sheet is bonded to the glass plate and subjected to accelerated environmental testing at high temperature and normal humidity (temperature: 95° C.). The air bubbles are presumed to be caused mainly by a gas generated (outgassing) inside the OCA sheet. The outgassing here is presumed to be caused by moisture and organic components, mainly moisture. Another possible cause of the air bubbles is the poor wettability of heat-curable polyurethane compositions containing a polycarbonate-based polyol with glass due to the relatively high polarity of the compositions, which makes the compositions vulnerable to elastic deformation at high temperature.

Meanwhile, in the case where a polyether-based polyol is used as a polyol component, the resulting OCA sheet was found to have excellent hydrolysis resistance that makes the sheet superior at high humidity. However, such an OCA sheet was found to have low heat resistance with which the OCA sheet is unfortunately heat-deteriorated and partially melted to come out of the product including the sheet. Also, when such an OCA sheet was subjected to accelerated environmental testing at high temperature and normal humidity (temperature: 95° C.), the OCA sheet was likely to have air bubbles at the interface with a glass plate.

The present invention has been made in view of the above current state of the art, and aims to provide an optically clear adhesive sheet using a heat-curable polyurethane composition, wherein the optically clear adhesive sheet can, when bonded to an adherend such as a glass plate, prevent the occurrence of air bubbles even at high temperature and normal humidity and maintain a stable bonded interface.

Solution to Problem

The inventors examined methods for producing optically clear adhesive sheets having excellent environment resistance using a heat-curable polyurethane composition. As a result, they found that use of a polyolefin-based polyol as a polyol component can impart good heat resistance and hydrophobicity, and is thus advantageous in preventing outgassing caused by moisture. Further, as a result of examination on polyisocyanate components to be used in combination with a polyolefin-based polyol, they found that use of a polyisocyanate components containing an acyclic aliphatic polyisocyanate and/or an alicyclic polyisocyanate can provide an optically clear adhesive sheet having excellent environment resistance which is capable of sufficiently preventing occurrence of air bubbles even at high temperature and normal humidity.

An optically clear adhesive sheet of the present invention is an optically clear adhesive sheet containing: a cured product of a heat-curable polyurethane composition, the heat-curable polyurethane composition containing a polyol component, and a polyisocyanate component, the polyol component having an olefin skeleton, the polyisocyanate component containing an acyclic aliphatic polyisocyanate and/or an alicyclic polyisocyanate.

Preferably, the polyisocyanate component includes at least one of isophorone diisocyanate, hexamethylene diisocyanate, and modified polyisocyanates, the modified polyisocyanates being obtained by reacting an acyclic aliphatic and/or alicyclic polyisocyanate having an isocyanate group with an ether compound having an ethylene oxide unit.

Preferably, the heat-curable polyurethane composition further contains a tackifier. Preferably, the tackifier contains at least one of an alicyclic saturated hydrocarbon resin and a hydrogenated petroleum resin obtained by hydrogenating a copolymer of dicyclopentadiene and an aromatic compound.

Preferably, the heat-curable polyurethane composition further contains a plasticizer.

A laminate of the present invention is a laminate including: the optically clear adhesive sheet of the present invention; a first release liner covering one surface of the optically clear adhesive sheet; and a second release liner covering the other surface of the optically clear adhesive sheet.

A method for producing a laminate of the present invention includes the steps of: mixing the polyol component and the polyisocyanate component under stirring; and pouring a liquid obtained by the mixing under stirring between the first release liner and the second release liner to cure the liquid.

A display device with a touchscreen of the present invention includes: the optically clear adhesive sheet of the present invention; a display panel; and a touchscreen.

Advantageous Effects of Invention

The optically clear adhesive sheet of the present invention has excellent resistance to environment while retaining the superior properties of a heat-curable polyurethane composition having excellent flexibility and being capable of giving a thick film. Specifically, the optically clear adhesive sheet of the present invention can, when bonded to an adherend such as a glass plate, prevent the occurrence of air bubbles even at high temperature and normal humidity and maintain a stable bonded interface. The optically clear adhesive sheet of the present invention is therefore suited to use in displays and tablet PCs, for example.

The laminate of the present invention can improve the handleability of the optically clear adhesive sheet of the present invention. The method for producing a laminate of the present invention can suitably produce the laminate. The display device with a touchscreen according to the present invention can improve the visibility of the display screen.

DESCRIPTION OF EMBODIMENTS

Figure 1:
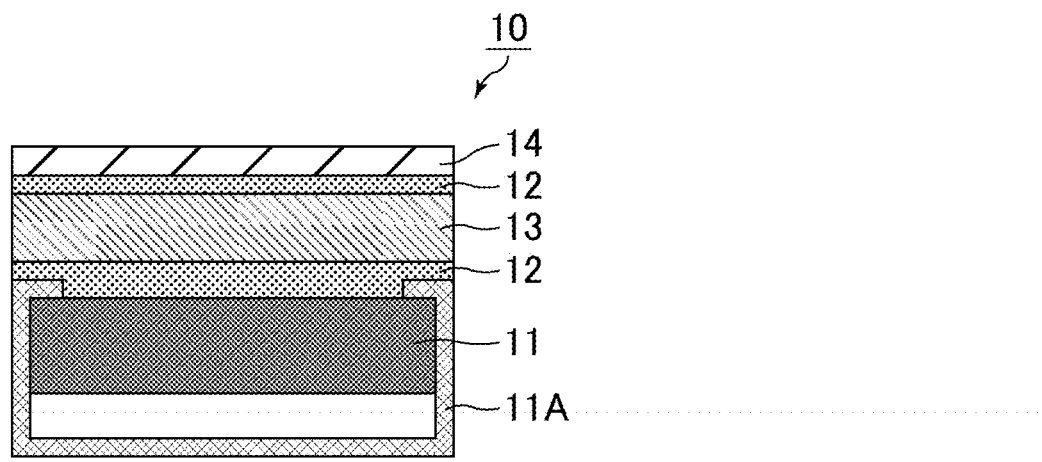
FIG. 1 shows a schematic cross-sectional view of an exemplary display device with a touchscreen which includes the optically clear adhesive sheet of the present invention.

The optically clear adhesive sheet of the present invention is an optically clear adhesive sheet containing: a cured product of a heat-curable polyurethane composition, the heat-curable polyurethane composition containing a polyol component, and a polyisocyanate component, the polyol component having an olefin skeleton, the polyisocyanate component containing an acyclic aliphatic polyisocyanate and/or an alicyclic polyisocyanate. The "optically clear adhesive sheet" as used herein has the same meaning as an "optically clear adhesive film".

The optically clear adhesive sheet of the present invention is formed of a cured product of a heat-curable polyurethane composition, and the heat-curable polyurethane composition contains a polyol component and a polyisocyanate component. The cured product of a heat-curable polyurethane composition is obtained by reacting the polyol component and the polyisocyanate component and has a structure represented by the following formula (A).

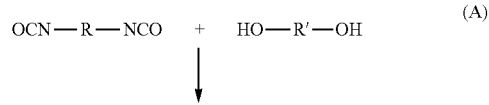

-continued

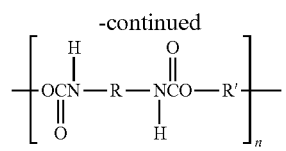

In the formula (A), R represents a non-NCO-group moiety of a polyisocyanate component, R' represents a non-OH-group moiety of a polyol component, and n represents the number of repeating units.

The cured product of a heat-curable polyurethane composition is preferably not an acrylic-modified one, and preferably contains no moiety derived from, for example, an acrylic ester or a methacrylic ester in the main chain. An acrylic-modified cured product of a heat-curable polyurethane composition is hydrophobic and is thus likely to cause moisture condensation at high temperature and high humidity. The moisture condensation may cause defects such as whitening and foaming to deteriorate the optical characteristics. With a non-acrylic-modified cured product of a heat-curable polyurethane composition, deterioration of the optical characteristics due to defects such as whitening and foaming at high temperature and high humidity can be prevented.

Both the polyol component and the polyisocyanate component can be components that are liquids at normal temperature (23° C.), so that a cured product of a heat-curable polyurethane composition can be obtained without a solvent. Other components such as a tackifier can be added to the polyol component or the polyisocyanate component, and are preferably added to the polyol component. Production of an optically clear adhesive sheet using a cured product of a heat-curable polyurethane composition, which requires no removal of a solvent, enables formation of a thick sheet with an even surface. The optically clear adhesive sheet of the present invention, when used to bond a display panel and a transparent member (touchscreen) having on its outer surface a transparent conductive film, can therefore conform to an uneven surface on which the bezel is present. Also, the optically clear adhesive sheet of the present invention can keep its optical characteristics even when made thick, and thus can sufficiently prevent transparency decrease (haze increase), coloring, and foaming (generation of air bubbles at the interface with the adherend).

Being formed of a cured product of a heat-curable polyurethane composition and flexible, the optically clear adhesive sheet of the present invention under tensile stress is elongated well and very unlikely to be torn. The optically clear adhesive sheet can therefore be peeled off without adhesive residue. Since the optically clear adhesive sheet of the present invention can be made thick while being flexible, the optically clear adhesive sheet is excellent in shock resistance and can be used to bond a transparent member having a transparent conductive film on its outer surface to a cover panel. In the case of using an additional member, the optically clear adhesive sheet can also be used to bond the display panel or the transparent member having a transparent conductive film on its outer surface to the additional member. The optically clear adhesive sheet of the present invention, being formed of a cured product of a heat-curable polyurethane composition, has a high dielectric constant and can give a higher capacitance than conventional optically clear adhesive sheets formed of an acrylic resin composition. The optically clear adhesive sheet of the present invention is therefore suitable for bonding of a capacitive touchscreen.

[Polyol Component]

The polyol component has an olefin skeleton, meaning that its main chain includes a polyolefin or a derivative thereof. A cured product of a heat-curable polyurethane composition obtained from a polyolefin-based polyol having an olefin skeleton has excellent heat resistance, owing to the structure of the main chain skeleton, compared to cured products obtained from other polyol components such as a polyether-based polyol. Examples of the polyol component having an olefin skeleton include polybutadiene-based polyols such as 1,2-polybutadiene polyol, 1,4-polybutadiene polyol, 1,2-polychloroprene polyol, and 1,4-polychloroprene polyol, polyisoprene-based polyols, and saturated compounds obtained by adding hydrogen or halogen atoms to the double bonds of these polyols, for example. The polyol component may be a polyol obtained by copolymerizing a polybutadiene-based polyol, for example, with an olefin compound (e.g., styrene, ethylene, vinyl acetate, or acrylic ester) or a hydrogenated compound thereof. The polyol component may have a linear or branched structure. These compounds for the polyol component may be used alone or in combination with each other.

The polyol component preferably has a number average molecular weight in the range of 300 to 5000. If the polyol component has a number average molecular weight of less than 300, the polyol component and the polyisocyanate component may react with each other very fast and the resulting cured product of a heat-curable polyurethane composition may be difficult to mold into a sheet with an even surface or the cured product of a heat-curable polyurethane composition may be less flexible and fragile. If the polyol component has a number average molecular weight of more than 5000, problems may arise such as that the polyol component may have a very high viscosity to make it difficult to mold the cured product of a heat-curable polyurethane composition into a sheet with an even surface and that the cured product of a heat-curable polyurethane composition may crystallize to make the product opaque. The polyol component more preferably has a number average molecular weight in the range of 500 to 3000.

Known examples of the polyol component having an olefin skeleton include a polyolefin polyol obtained by hydrogenating a hydroxy group-terminated polyisoprene ("EPOL (registered trademark)" available from Idemitsu Kosan Co., Ltd., number average molecular weight: 2500), both-end hydroxy group-terminated hydrogenated polybutadiene ("GI-1000" available from Nippon Soda Co., Ltd., number average molecular weight: 1500), and polyhydroxy polyolefin oligomer ("POLYTAIL (registered trademark)" available from Mitsubishi Chemical Corporation).

[Polyisocyanate Component]

The polyisocyanate component contains an acyclic aliphatic polyisocyanate and/or an alicyclic polyisocyanate. In other words, the polyisocyanate component is a polyisocyanate having a structure derived from at least one of an acyclic aliphatic diisocyanate, an alicyclic diisocyanate, and an acyclic aliphatic and/or alicyclic polyisocyanate.

Examples of the acyclic aliphatic polyisocyanate include hexamethylene diisocyanate (HDI), tetramethylene diisocyanate, 2-methyl-pentane-1,5-diisocyanate, 3-methyl-pentane-1,5-diisocyanate, lysine diisocyanate, trioxyethylene diisocyanate, and modified products thereof. These may be used alone or in combination with each other. Examples of the alicyclic polyisocyanate include isophorone diisocyanate (IPDI), cyclohexyl diisocyanate, 4,4'-dicyclohexylmethane diisocyanate, norbornane diisocyanate, hydrogenated tolylene diisocyanate, hydrogenated xylene diisocyanate, hydrogenated tetramethyl xylene diisocyanate, and modified products thereof. These may be used alone or in combination with each other. Examples of the modified products of hexamethylene diisocyanate include isocyanurate-modified, allophanate-modified, and/or urethane-modified products of hexamethylene diisocyanate.

Examples of the polyisocyanate having a structure derived from an acyclic aliphatic and/or alicyclic polyisocyanate include modified polyisocyanates obtained by reacting an acyclic aliphatic and/or alicyclic polyisocyanate containing an isocyanate group with an ether compound having an ethylene oxide unit. Acyclic aliphatic and/or alicyclic polyisocyanates that can be used to obtain modified polyisocyanates include at least one of the acyclic aliphatic polyisocyanates, the alicyclic polyisocyanates, and polyisocyanates obtained from starting materials of acyclic aliphatic and/or alicyclic diisocyanates. Hexamethylene diisocyanate, isophorone diisocyanate, and modified products thereof are preferred, and hexamethylene diisocyanate and modified products thereof are particularly preferred.

The polyisocyanate component includes at least one of isophorone diisocyanate, hexamethylene diisocyanate, and modified polyisocyanates. The modified polyisocyanates are preferably those obtained by reacting an acyclic aliphatic and/or alicyclic polyisocyanate having an isocyanate group with an ether compound having an ethylene oxide unit.

The isophorone diisocyanate has good compatibility with olefin-based polyols and has low viscosity, and thus can be sufficiently mixed with olefin-based polyols. This provides a particularly excellent effect to prevent air bubbles (outgassing). The isophorone diisocyanate-based polyisocyanate is also advantageous in that it is safer than other polyisocyanates such as HDI (hexamethylene diisocyanate)-based polyisocyanates.

The modified polyisocyanate derived from an acyclic aliphatic and/or alicyclic polyisocyanate can reduce the chances of coloring or discoloration of the optically clear adhesive sheet and enables the optically clear adhesive sheet to exhibit long-lasting transparency with higher reliability. Also, being modified with an ether compound having an ethylene oxide unit, the polyisocyanate component can prevent whitening owing to its hydrophilic moiety (ethylene oxide unit) and can exhibit compatibility with low-polarity components such as a tackifier and a plasticizer owing to its hydrophobic moiety (the other units).

Examples of the ether compound having an ethylene oxide unit include alcohol-, phenol-, or amine-ethylene oxide adducts. In order to improve the hydrophilicity, ether compounds having three or more ethylene oxide units per molecule are preferred.

Examples of the alcohol-ethylene oxide adducts include ethylene oxide adducts of monovalent alcohols, divalent alcohols (e.g., ethylene glycol, diethylene glycol, propylene glycol, dipropylene glycol, 1,4-butanediol, 1,6-hexanediol, 1,3-butylenediol, neopentyl glycol), and trivalent alcohols (e.g., glycerol, trimethylol propane). These may be used alone or in combination with each other.

Examples of the phenol-ethylene oxide adducts include ethylene oxide adducts of hydroquinone, bisphenols (e.g., bisphenol A, bisphenol F), and phenol-formaldehyde condensates with a low condensation degree (novolac resin and resol prepolymers). These may be used alone or in combination with each other.

The ethylene oxide unit content is preferably in the range of 1 to 20 wt % of the entire heat-curable polyurethane composition. If the ethylene oxide unit content is less than 1 wt %, whitening may not be sufficiently prevented. If the ethylene oxide unit content is more than 20 wt %, the compatibility with the low-polarity components such as a tackifier and a plasticizer may be low and thus the optical characteristics such as haze may be poor.

The number of isocyanate groups per molecule of the modified polyisocyanate is preferably 2.0 or higher on average. If the number of isocyanate groups is lower than 2.0 on average, the heat-curable polyurethane composition may not be sufficiently cured due to a decrease in the crosslinking density.

The α ratio (the number of moles of OH groups derived from polyol component/the number of moles of NCO groups derived from polyisocyanate component) of the heat-curable polyurethane composition is preferably 0.8 to 1.8. If the α ratio is lower than 0.8, it means that the amount of the polyisocyanate component is excessive for the amount of the polyol component, so that there will be more unreacted residual NCO groups, and the heat-curable polyurethane composition may have unstable physical properties. If the α ratio is higher than 1.8, the shape obtained by molding may not be maintained at high temperature and normal humidity (temperature: 95° C.) or at high temperature and high humidity (temperature: 85° C.; humidity: 85%). The lower limit of the α ratio is more preferably 0.9, and the upper limit thereof is more preferably 1.6. If the α ratio is higher than 1.6, the shape of the resulting product may slightly change after the product is left at high temperature and high humidity for a long period of time.

[Tackifier]

The heat-curable polyurethane composition may further contain a tackifier (adhesive-imparting agent). A tackifier is an additive that is added to enhance the adhesive strength, and is typically an amorphous oligomer having a molecular weight of several hundreds to several thousands which is a thermoplastic resin in a liquid or solid state at normal temperature. A heat-curable polyurethane composition containing a tackifier imparts a sufficient adhesive strength to each surface of an optically clear adhesive sheet formed of a cured product of the heat-curable polyurethane composition.

Non-limiting examples of the tackifier include petroleum resin-based tackifiers, hydrocarbon resin-based tackifiers, rosin-based tackifiers, and terpene-based tackifiers. These may be used alone or in combination with each other.

The tackifier is preferably a petroleum resin-based tackifier because it has excellent compatibility with the polyol component having an olefin skeleton. An especially preferred petroleum resin-based tackifier is a hydrogenated petroleum resin obtained by hydrogenating a copolymer of dicyclopentadiene and an aromatic compound. Dicyclopentadiene is obtainable from a C5 fraction. Examples of the aromatic compound include vinyl aromatic compounds such as styrene, α-methylstyrene, and vinyl toluene. The ratio of dicyclopentadiene to a vinyl aromatic compound is not particularly limited, but the ratio by weight of dicyclopentadiene to a vinyl aromatic compound (dicyclopentadiene: vinyl aromatic compound) is preferably 70:30 to 20:80, more preferably 60:40 to 40:60. The hydrogenated petroleum resin has a softening point of preferably 90° C. to 160° C., a vinyl aromatic compound unit content of preferably 35 mass % or less, a bromine value of preferably 0 to 30 g/100 g, and a number average molecular weight of preferably 500 to 1100. Known examples of the hydrogenated petroleum resin include "I-MARV P-100" available from Idemitsu Kosan Co., Ltd.

The tackifier is also preferably a hydrocarbon resin-based tackifier because it has excellent compatibility with the polyol component having an olefin skeleton. An especially preferred hydrocarbon resin-based tackifier is an alicyclic saturated hydrocarbon resin. Known examples of the alicyclic saturated hydrocarbon resin include "ARKON P-100" available from Arakawa Chemical Industries, Ltd.

The tackifier preferably has an acid value of 1 mg KOH/g or less. The tackifier with an acid value of 1 mg KOH/g or less can be sufficiently prevented from inhibiting the reaction between the polyol component and the polyisocyanate component. The tackifier preferably has a softening point in the range of 80° C. to 120° C., more preferably in the range of 80° C. to 100° C. With a softening point in the range of 80° C. to 120° C., heat deterioration of the polyol component can be sufficiently avoided when the tackifier is dissolved in the polyol component.

The tackifier content is preferably in the range of 1 to 20 wt % of the heat-curable polyurethane composition. If the tackifier content is less than 1 wt %, the resulting optically clear adhesive sheet may fail to exhibit sufficient adhesive strength, especially at high temperature and high humidity. If the tackifier content is more than 20 wt %, the tackifier may inhibit the reaction between the polyol component and the polyisocyanate component to cause insufficient urethane crosslinking in the cured product of the heat-curable polyurethane composition. The resulting optically clear adhesive sheet may be melted and deformed or cause the tackifier to deposit (bleed) at high temperature and high humidity. Also, the reaction time for the polyol component and the polyisocyanate component could be lengthened to allow sufficient urethane crosslinking, but this deteriorates the productivity.

[Plasticizer]

The heat-curable polyurethane composition may further contain a plasticizer. Addition of a plasticizer decreases the rigidity, thereby suppressing the occurrence of air bubbles (bonding failure) when the optically clear adhesive sheet of the present invention is bonded to an adherend. Addition of a plasticizer can also improve the handleability of the optically clear adhesive sheet of the present invention and the capability of the optically clear adhesive sheet to conform to uneven surfaces. In the case where a polyolefin-based polyol is used in combination with isophorone diisocyanate, the hardness of the resulting sheet may be high when the α ratio is low, but the use of a plasticizer can adjust the hardness within an appropriate range. The addition of a plasticizer may possibly reduce the adhesive strength, but the optically clear adhesive sheet of the present invention, even with such reduced adhesive strength, can ensure sufficient adhesive strength.

The plasticizer may be any compound used to impart flexibility to a thermoplastic resin, and preferably includes a carboxylic acid-based plasticizer in view of compatibility and weather resistance. Examples of the carboxylic acid-based plasticizer include phthalic esters (phthalic acid-based plasticizers) (e.g., diundecyl phthalate, dioctyl phthalate, diisononyl phthalate, diisodecyl phthalate, and dibutyl phthalate); 1,2-cyclohexanedicarboxylic acid diisononyl ester; adipic acid esters; trimellitic acid esters; maleic acid esters; benzoic acid esters; and poly-α-olefin. These may be used alone or in combination with each other. Known examples of the carboxylic acid-based plasticizer include "DINCH" available from BASF, "SANSO CIZER DUP" available from New Japan Chemical Co., Ltd., and "Durasyn (registered trademark) 148" available from Ineous Oligomers.

[Catalyst]

The heat-curable polyurethane composition may further contain a catalyst. The catalyst may be any catalyst used in a urethane modification reaction. Examples thereof include organotin compounds (e.g., di-n-butyltin dilaurate, dimethyltin dilaurate, dibutyltin oxide, tin octanoate); organotitanium compounds; organozirconium compounds; tin carboxylates; bismuth carboxylates; and amine-based catalysts (e.g., triethylene diamine).

The catalyst is preferably a non-amine-based catalyst. In the case of using an amine-based catalyst, the optically clear adhesive sheet may be easily discolored. More preferred as the catalyst is dimethyltin dilaurate.

The amount of the catalyst added is preferably in the range of 0.001 to 0.1 wt % of the total amount of the polyol component and the polyisocyanate component.

[Monoisocyanate Component]

The heat-curable polyurethane composition may further contain a monoisocyanate component. Owing to the presence of the monoisocyanate component, the heat-curable polyurethane composition can give enhanced adhesive strength to the optically clear adhesive sheet at high temperature and high humidity without reducing the flexibility required for the sheet. In the case where the heat-curable polyurethane composition has an α ratio of 1 or higher, the monoisocyanate component is preferably used to prevent unreacted OH groups from remaining in the resulting cured product.

The monoisocyanate component is a compound containing one isocyanate group in a molecule. Specific examples thereof include octadecyl diisocyanate (ODI), 2-methacryloyloxyethyl isocyanate (MOI), 2-acryloyloxyethyl isocyanate (AOI), octyl isocyanate, heptyl isocyanate, ethyl 3-isocyanatopropionate, cyclopentyl isocyanate, cyclohexyl isocyanate, 1-isocyanato-2-methoxyethane, ethyl isocyanatoacetate, butyl isocyanatoacetate, and p-toluenesulfonyl isocyanate. These may be used alone or in combination with each other. The monoisocyanate component is preferably 2-methacryloyloxyethyl isocyanate (MOI). This is because MOI has good compatibility with the polyol component and has high hydrophobicity.

Still, in the case where the heat-curable polyurethane composition contains a monoisocyanate component, the monoisocyanate component may undesirably modify the urethane skeleton to deteriorate the characteristics of the resulting sheet. In addition, the monoisocyanate component, if contained in an excess amount, may react with moisture in the air to cause foaming. For these reasons, in consideration of the robustness of the design in production of the optically clear adhesive sheet of the present invention, the heat-curable polyurethane composition preferably contains no monoisocyanate component.

The heat-curable polyurethane composition may contain, as necessary, various additives such as colorants, stabilizers, antioxidants, antifungal agents, and flame retardants as long as the characteristics required for the optically clear adhesive sheet are not deteriorated.

The optically clear adhesive sheet of the present invention preferably has, but is not particularly limited to, a thickness in the range of 50 to 2000 μm. The optically clear adhesive sheet having a thickness of less than 50 μm, when one of its surfaces is bonded to the surface of an optical member, may not be able to conform to a rough or uneven surface of the optical member. As a result, the other surface of the optically clear adhesive sheet may fail to be bonded to another optical member with a sufficient adhesive strength. The optically clear adhesive sheet having a thickness of more than 2000 μm may be insufficient in optical characteristics such as haze and total light transmittance. The lower limit of the thickness of the optically clear adhesive sheet is more preferably 100 μm, still more preferably 200 μm. The upper limit of the thickness of the optically clear adhesive sheet is more preferably 1500 µm, still more preferably 1000 µm. The optically clear adhesive sheet preferably has a thickness that is triple or more the height of the highest peak of a rough or uneven bonding surface of the adherend.

The optically clear adhesive sheet of the present invention preferably has a haze of 1% or lower and a total light transmittance of 90% or higher in order to have the optically clear adhesive sheet characteristics. The haze and the total light transmittance can each be measured with, for example, a turbidity meter "Haze Meter NDH2000" available from Nippon Denshoku Industries Co., Ltd. The haze is measured by a process in accordance with JIS K 7136, and the total light transmittance is measured by a process in accordance with JIS K 7361-1.

The optically clear adhesive sheet of the present invention preferably has an adhesive strength in the range of 0.1 N/25 mm to 15 N/25 mm at normal temperature and normal humidity, as measured by a 180° peel test. The adhesive strength is more preferably 1 to 10 N/25 mm. The adhesive strength is also preferably 1.0 N/25 mm or more, more preferably in the range of 4 N/25 mm to 15 N/25 mm, still more preferably in the range of 10 N/25 mm to 15 N/25 mm, at high temperature and high humidity. The optically clear adhesive sheet having an adhesive strength of 15 N/25 mm or less, when used to bond an optical member such as a touchscreen to another optical member, can be peeled off without adhesive residue, thus exhibiting excellent reworkability. If the adhesive strength of the optically clear adhesive sheet is excessively high, it may be difficult to remove air bubbles trapped between the optically clear adhesive sheet and the adherend.

The optically clear adhesive sheet of the present invention preferably has a micro rubber hardness (type A) in the range of 0.1° to 25°. The optically clear adhesive sheet having a micro rubber hardness (type A) of less than 0.1° may exhibit low handleability in use (during bonding of an optical member) and may be deformed. In contrast, the optically clear adhesive sheet having a micro rubber hardness (type A) of more than 25° may exhibit low flexibility and, during bonding of an optical member, may fail to conform to the surface shape of the optical member and include air between itself and the optical member. This may eventually cause peeling of the sheet from the optical member. Also, the optically clear adhesive sheet having low flexibility may fail to conform to an uneven surface on which the bezel is present, during bonding of an optical member such as a touchscreen to the display panel. The optically clear adhesive sheet more preferably has a micro rubber hardness (type A) in the range of 0.5° to 15°. The micro rubber hardness (type A) can be measured with, for example, a micro durometer "MD-1 Type A" available from Kobunshi Keiki Co., Ltd. The micro durometer "MD-1 Type A" is a durometer designed and produced as an approximately ⅕-sized compact model of a spring type A durometer, and is capable of giving the same measurement result as a spring type A durometer even when the measuring object is thin.

The optically clear adhesive sheet of the present invention may have a release liner on each surface. It is one aspect of the present invention to provide a laminate including: the optically clear adhesive sheet of the present invention; a first release liner covering one surface of the optically clear adhesive sheet; and a second release liner covering the other surface of the optically clear adhesive sheet (hereinafter, such a laminate is referred to as the "laminate of the present invention"). The first and second release liners can protect the surfaces of the optically clear adhesive sheet of the present invention until immediately before being bonded to an adherend. The release liners therefore prevent deterioration of adhesion and sticking of foreign matters. Also, the surfaces can be prevented from being bonded to something other than the adherend, so that the handleability of the optically clear adhesive sheet of the present invention can be improved.

The first and second release liners can each be, for example, a polyethylene terephthalate (PET) film. The materials of the first release liner and the second release liner may be the same as or different from each other, and the thicknesses thereof may also be the same as or different from each other.

The bonding strength (peel strength) between the optically clear adhesive sheet of the present invention and the first release liner and the bonding strength between the optically clear adhesive sheet of the present invention and the second release liner are preferably different from each other. Such a difference in bonding strength makes it easy to peel one of the first and second release liners (release liner with lower bonding strength) alone from the laminate of the present invention and bond the exposed first surface of the optically clear adhesive sheet and the first adherend to each other, followed by peeling the other of the first and second release liners (release liner with higher bonding strength) and then bonding the exposed second surface of the optically clear adhesive sheet and the second adherend to each other. Easy-peel treatment (release treatment) may be conducted on one or both of the surface of the first release liner coming into contact with the optically clear adhesive sheet of the present invention and the surface of the second release liner coming into contact with the optically clear adhesive sheet of the present invention. Examples of the easy-peel treatment include siliconizing.

Application of the optically clear adhesive sheet of the present invention may be, but is not particularly limited to, bonding of members such as a display panel, a touchscreen, and a cover panel to each other, for example. It is another aspect of the present invention to provide a display device with a touchscreen including: the optically clear adhesive sheet of the present invention; a display panel; and a touchscreen (hereinafter, such a display device is also referred to as the "display device with a touchscreen according to the present invention").

FIG. 1 shows a schematic cross-sectional view of an exemplary display device with a touchscreen which includes the optically clear adhesive sheet of the present invention. A display device 10 shown in FIG. 1 includes a display panel 11, an optically clear adhesive sheet 12, a touchscreen (glass substrate with an ITO transparent conductive film) 13, another optically clear adhesive sheet 12, and a transparent cover panel 14 stacked in the given order. The three optical members, namely the display panel 11, the touchscreen 13, and the transparent cover panel 14, are integrated into one member with the two optically clear adhesive sheets 12 of the present invention. The display panel 11 can be of any type, such as a liquid crystal panel or an organic electroluminescent panel (organic EL panel). The touchscreen 13 can be, for example, a resistive touchscreen or a capacitive touchscreen.

The display panel 11 is housed in a bezel 11A (housing for the display panel 11) provided with an opening on the display surface side. The outer edge of the opening of the bezel 11A includes the uneven surface corresponding to the thickness of the bezel 11A. The optically clear adhesive sheet 12 bonded covers the display surface sides of the display panel 11 and the bezel 11A to conform to the uneven surface corresponding to the thickness of the bezel 11A. In order to conform to the uneven surface corresponding to the thickness of the bezel 11A, the optically clear adhesive sheet 12 is required to have flexibility and to be thicker than the bezel 11A. Thus, the optically clear adhesive sheet 12 used to bond an optical member to the display panel 11 housed in the bezel 11A preferably has a thickness of 700 μm or more. The optically clear adhesive sheet 12 of the present invention exhibits sufficient optical characteristics and flexibility even in the case of having a thickness of 700 μm or more, and is therefore suited to bonding of an optical member to the display panel 11 housed in the bezel 11A.

The optically clear adhesive sheet of the present invention employed in such a display device is less likely to decrease in the adhesive strength under various conditions, and enables lasting, tight bonding of the optical members. As a result, no gap is formed between the optical members and the optically clear adhesive sheet, so that deterioration of visibility due to factors such as an increase in the interfacial reflection can be prevented. In particular, the optically clear adhesive sheet of the present invention is suitable for a display device incorporated into an automotive navigation system which needs to have high reliability, for example.

The optically clear adhesive sheet of the present invention may be produced by any method such as a method in which a heat-curable polyurethane composition is prepared, and then the composition is molded while being heat-cured by a known method. A preferred method for producing the optically clear adhesive sheet of the present invention includes the steps of: mixing the polyol component and the polyisocyanate component under stirring; and pouring a liquid obtained by the mixing under stirring between the first release liner and the second release liner to cure the liquid. In this preferred production method, it is possible to bond the first and second release liners at the same time while the optically clear adhesive sheet of the present invention is produced. In other words, the laminate of the present invention can be produced. It is another aspect of the present invention to provide such a method for producing the laminate of the present invention including the steps of: mixing the polyol component and the polyisocyanate component under stirring; and pouring a liquid obtained by the mixing under stirring between the first release liner and the second release liner to cure the liquid (hereinafter also referred to as the "method for producing the laminate of the present invention"). In the step of mixing under stirring, a tackifier and/or a plasticizer may be mixed under stirring together with the polyol component and the polyisocyanate component.

A specific example of the method for producing a laminate of the present invention is as follows. First, a masterbatch is prepared by adding a given amount of a tackifier to a polyol component and dissolving the tackifier by stirring while heating. Subsequently, the obtained masterbatch, an additional polyol component, and a polyisocyanate component as well as other components such as a plasticizer and a catalyst as necessary are mixed under stirring using a mixer, for example, so that a liquid or gel heat-curable polyurethane composition is obtained. The heat-curable polyurethane composition is then immediately fed into a molding machine such that the heat-curable polyurethane composition is crosslinked and cured while being transported in the state of being sandwiched between the first and second release liners. Thereby, the heat-curable polyurethane composition is semi-cured into a sheet integrated with the first and second release liners. The sheet is then crosslinked in a furnace for a given period of time, whereby an optically clear adhesive sheet formed of a cured product of a heat-curable polyurethane composition is obtained. Through these steps, the laminate of the present invention is formed.

Figure 2:
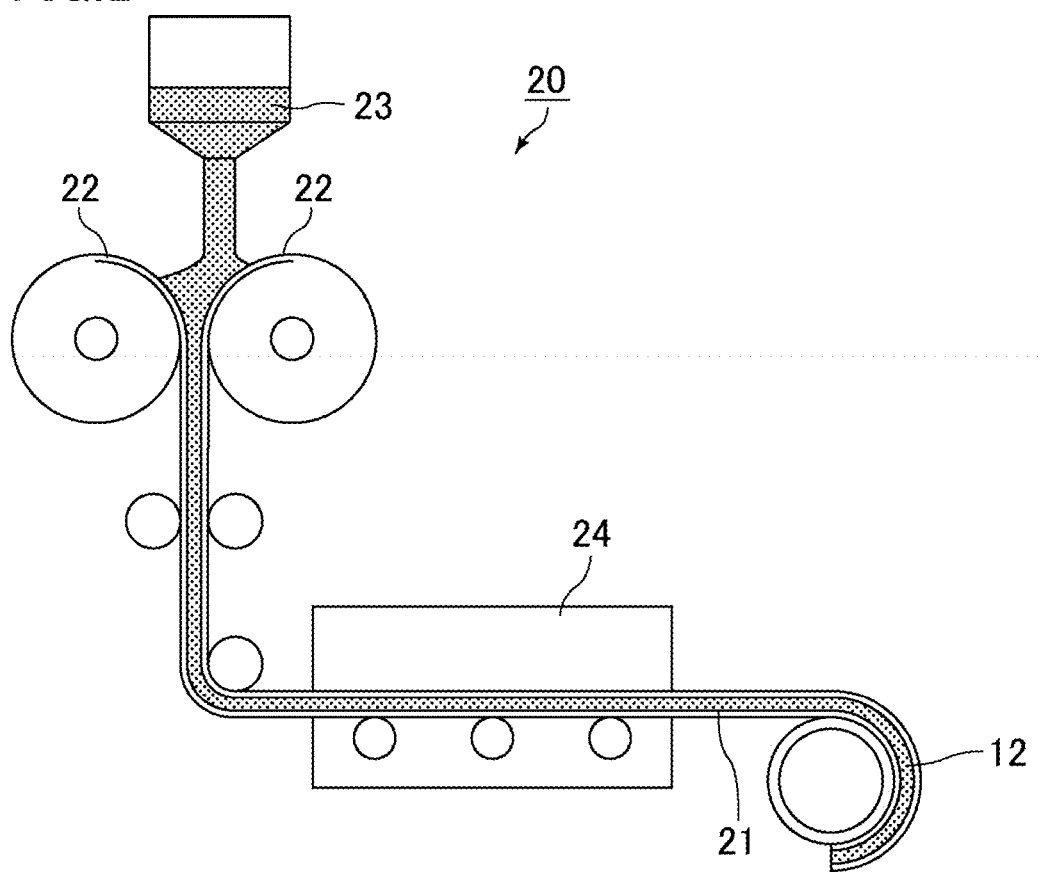
FIG. 2 shows a schematic view for describing an exemplary molding machine used in production of the optically clear adhesive sheet of the present invention.

FIG. 2 shows a schematic view for describing an exemplary molding machine used in production of the optically clear adhesive sheet of the present invention. In a molding machine 20 shown in FIG. 2, a liquid or gel uncured heat-curable polyurethane composition 23 is poured between paired release liners (PET films) 21 continuously fed by paired rollers 22 which are disposed with a space in between. With the heat-curable polyurethane composition 23 retained between the release liners 21, the composition is transported into a heating machine 24 while being cured (crosslinked). In the heating machine 24, the heat-curable polyurethane composition 23 is heat-cured while being retained between the release liners 21, whereby molding of the optically clear adhesive sheet 12 formed of a cured product of the heat-curable polyurethane composition is completed.

The method for producing the optically clear adhesive sheet of the present invention may include, after preparation of an uncured heat-curable polyurethane composition, film formation using a general film-forming machine (e.g., any of various coating machines, bar coater, doctor blade) or by a film-forming treatment. The optically clear adhesive sheet of the present invention may alternatively be produced by centrifugal molding.

EXAMPLES

The present invention is described in more detailed below based on examples. The examples, however, are not intended to limit the scope of the present invention.
(Materials)
Materials used to prepare a heat-curable polyurethane composition in the following examples and comparative examples are listed below.
(1) Polyol Component
Polyolefin polyol ("EPOL (registered trademark)" available from Idemitsu Kosan Co., Ltd.; number average molecular weight: 2500)
Polycarbonate polyol ("L34" available from Tosoh Corporation; number average molecular weight: 500)
Polyether polyol ("Pandex GCB-41" available from DIC Corporation)
(2) Polyisocyanate Component
IPDI (isophorone diisocyanate)-based polyisocyanate ("Desmodur I" available from Sumika Bayer Urethane Co., Ltd.)
  Hexamethylene diisocyanate (HDI) (Tosoh Corporation)
  HDI-based polyisocyanate A (Tosoh Corporation)
  HDI-based polyisocyanate B (Tosoh Corporation)
  HDI-based polyisocyanate C (Tosoh Corporation)
  HDI-basedpolyisocyanate ("Pandex GCA-11" available from DIC Corporation)
(3) Tackifier
Hydrogenated petroleum resin ("I-MARV P-100" available from Idemitsu Kosan Co., Ltd.)
Hydrogenated terpene resin ("CLEARON P85" available from Yasuhara Chemical Co., Ltd.)
Rosin diol-based tackifier ("KE-601" available from Arakawa Chemical Industries, Ltd.)
(4) Plasticizer
Mixture of 80% 1,2-cyclohexanedicarboxylic acid diisononyl ester and 20% adipic acid-based polyester ("OFH 55" available from BASF, product obtained by substituting about 20% of "DINCH" available from BASF by the adipic acid-based polyester)

1,2-Cyclohexane dicarboxylic acid diisononyl ester ("DINCH" available from BASF)

Diundecyl phthalate ("SANSO CIZER DUP" available from New Japan Chemical Co., Ltd.)

Di(2-ethylhexyl) sebacate ("SANSO CIZER DOS" available from New Japan Chemical Co., Ltd.)

Poly-α-olefin ("Durasyn (registered trademark) 148" available from Ineous Oligomers, hydrogenated 1-dodecene homopolymer)

Trimellitic acid isononyl ester ("Adekacizer C-9N" available from ADEKA)

Alkyl-substituted diphenyl ether ("MORESCO HILUBE LB-100" available from MORESCO)
(5) Catalyst
Dimethyltin dilaurate ("Fomrez catalyst UL-28" available from Momentive)

The HDI-based polyisocyanates A to C are each obtained by reacting an ether polyol having three or more ethylene oxide units per molecule on average with HDI or a polyisocyanate synthesized from starting materials of HDI monomers. The amount of the ethylene oxide units (hydrophilic component) in the HDI-based polyisocyanate B is controlled to be ⅔ of that in the HDI-based polyisocyanate A by replacing the ethylene oxide units by a hydrophobic component such as polypropylene glycol (PPG) and controlling the molecular weight of the HDI-based polyisocyanate B to be substantially the same as that of the HDI-based polyisocyanate A. The amount of the ethylene oxide units in the HDI-based polyisocyanate C is controlled to be half of that in the HDI-based polyisocyanate B by replacing the ethylene oxide units by a hydrophobic component. The IPDI-based polyisocyanate contains no ethylene oxide units, and hardly contains a hydrophilic component.

<In the Case where the Polyisocyanate Component is Isophorone Diisocyanate-Based Polyisocyanate (A)>

Example A-1

First, a solid tackifier (CLEARON P85) was added to a polyolefin polyol (EPOL) whose temperature was controlled to 100° C. to 150° C., and the mixture was stirred so that amasterbatch containing a tackifier dissolved in a polyolefin polyol was obtained. Here, the tackifier content in the masterbatch was adjusted to 30 wt %. Then, apolyolefin-polyol (EPOL) (100 parts by weight), an IPDI-based polyisocyanate (Desmodur I) (11.7 parts by weight), the tackifier masterbatch (33.3 parts by weight), and a catalyst (dimethyltin dilaurate) (0.05 parts by weight) were mixed with stirring using an oscillating model agitator "Ajiter". Thus, a heat-curable polyurethane composition was prepared.

Subsequently, the obtained heat-curable polyurethane composition was fed into the molding machine 20 shown in FIG. 2. The heat-curable polyurethane composition was crosslinked and cured at a furnace temperature of 50° C. to 90° C. for a furnace time of several minutes while being transported in the state of being sandwiched between the paired release liners (PET films with release-treated surfaces) 21, and thereby a sheet with the release liners 21 was obtained. Subsequently, the sheet was crosslinked in the heating machine 24 for 10 to 15 hours, so that the optically clear adhesive sheet 12 having the release liner 21 on each surface and formed of a cured product of a heat-curable polyurethane composition (hereinafter, such a sheet is also referred to as the "optically clear adhesive sheet with release liners") was produced.

Figure 3:
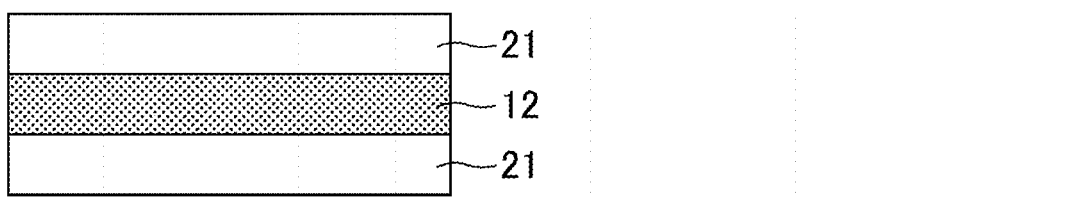
FIG. 3 shows a schematic cross-sectional view of an optically clear adhesive sheet with release liners of Example A-1.

FIG. 3 shows a schematic cross-sectional view of an optically clear adhesive sheet with release liners of Example A-1. As shown in FIG. 3, the obtained optically clear adhesive sheet with release liners was a laminate of the release liner 21, the optically clear adhesive sheet 12 formed of a cured product of a heat-curable polyurethane composition, and the release liner 21. The optically clear adhesive sheet 12 had a thickness of 300 μm.

Examples A-2 to A-18 and Comparative Examples A-1 to A-3

Optically clear adhesive sheet with release liners according to Examples A-2 to A-18 and Comparative Examples A-1 to A-3 were produced as in Example A-1, except that the composition was changed as shown in the following Tables 1 to 3.

(Evaluation on Optically Clear Adhesive Sheet)

The optically clear adhesive sheets with release liners produced in Examples A-1 to A-18 and Comparative Examples A-1 to A-3 were subjected to (1) micro rubber hardness (type A) measurement; (2) optical characteristics evaluation; (3) checking for initial air bubbles after vacuum bonding; (4) checking for air bubbles and changes in sheet shape at high temperature and normal humidity; and (5) adhesive strength evaluation, by the following methods. The results are shown in Tables 1 to 3 below.

(1) Micro Rubber Hardness (Type A) Measurement

The optically clear adhesive sheet was cut to a size of 75 nm (length)×25 mm (width) to obtain samples of the optically clear adhesive sheet from which the release liners were peeled. The hardness of each sample at normal temperature was measured with a microrubber hardness meter "MD-1 Type A" available from Kobunshi Keiki Co., Ltd. In this measurement, a cylindrical indenter having a diameter of 0.16 mm and a height of 0.5 mm was used. In each of the examples and comparative examples, one sample was prepared and subjected to the measurement four times. The median of the obtained four measurement values was used as the measurement result in each of the examples and comparative examples.

(2) Optical Characteristics Evaluation

One of the release liners of the optically clear adhesive sheet with release liners was peeled off, and the exposed optically clear adhesive sheet of the sample was bonded to a microscope slide. The members were retained in this state at a pressure of 0.4 MPa for 30 minutes, so that the optically clear adhesive sheet and the microscope slide were bonded to each other. The other release liner on the side opposite to the microscope slide was then peeled off, and the following measurements were performed.

(2-1) Haze Measurement

The haze was measured by a method in conformity with JIS K 7136 using a turbidity meter "Haze Meter NDH2000" available from Nippon Denshoku Industries Co., Ltd. In each of the examples and comparative examples, three samples were prepared and subjected to the measurement at normal temperature and normal humidity. The average of the obtained three measurement values was used as the measurement result in each of the examples and comparative examples.

(2-2) Total Light Transmittance Measurement

The total light transmittance was measured by a method in conformity with JIS K 7361-1 using a turbidity meter "Haze Meter NDH2000" available from Nippon Denshoku Industries Co., Ltd. In each of the examples and comparative examples, three samples were prepared and subjected to the measurement at normal temperature and normal humidity. The average of the obtained three measurement values was used as the measurement result in each of the examples and comparative examples.

(3) Checking for Initial Air Bubbles after Vacuum Bonding

One of the release liners of each optically clear adhesive sheet with release liners was peeled off, and the exposed optically clear adhesive sheet of the sample was bonded to a microscope slide (made of soda-lime glass) in a vacuum of 50 Pa at a bonding pressure of 2.1 MPa using a vacuum bonding machine at normal temperature and normal humidity. After bonding, the optically clear adhesive sheet was left in an indoor environment at normal temperature and normal humidity for 30 minutes. Subsequently, the presence or absence of air bubbles was visually checked.

(4) Checking for Air Bubbles and Changes in Shape at High Temperature and Normal Humidity The optically clear adhesive sheet bonded to a microscope slide in (3) above was left in an indoor environment at normal temperature and normal humidity for 24 hours. Subsequently, the optically clear adhesive sheet was put into an oven, and left at high temperature and normal humidity (95° C.) for 300 hours. The optically clear adhesive sheet taken out from the oven was subjected to visual checking for the presence or absence of air bubbles and for changes in shape of each sheet. Here, in the high temperature and normal humidity conditions, the temperature was set to 95° C. using a convection oven, but the humidity was not controlled.

(5) Adhesive Strength Evaluation

Figure 4A:
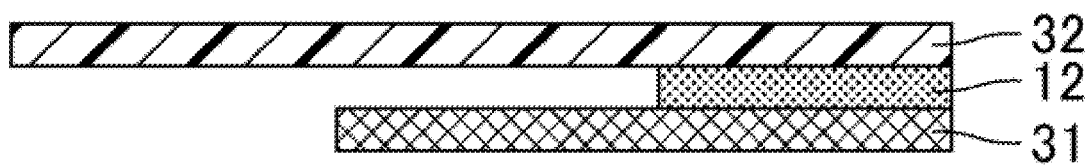
FIG. 4A and FIG. 4B shows schematic views for describing the method for evaluating the adhesive strength of the optically clear adhesive sheets of examples and comparative examples.
Figure 4B:
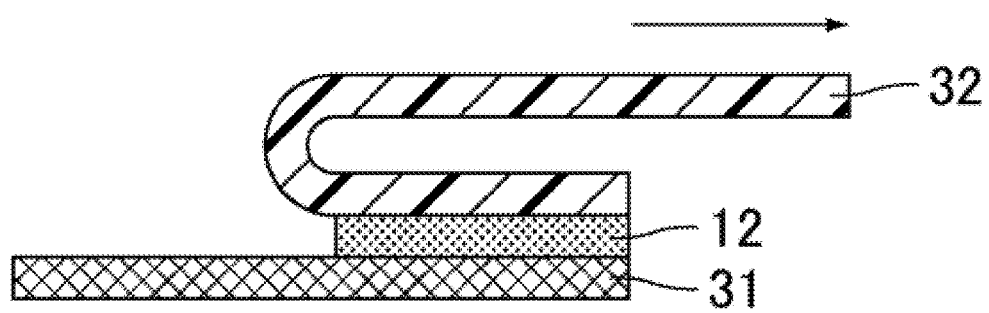

A 180° peel test was conducted by the following method to measure the adhesive strength (N/25 mm). FIG. 4A and FIG. 4B shows schematic views for describing the method for evaluating the adhesive strength of the optically clear adhesive sheets of examples and comparative examples. The optically clear adhesive sheet with release liners produced in each of the examples and comparative examples was cut into a sample having a size of 75 mm (length)×25 mm (width). One of the release liners of this sample was peeled off, and the exposed optically clear adhesive sheet 12 of the sample was bonded to a microscope slide 31 having a size of 75 mm (length)×25 mm (width). The members were retained in this state at a pressure of 0.4 MPa for 30 minutes, so that the optically clear adhesive sheet 12 and the microscope slide 31 were bonded to each other. Next, the other release liner on the side opposite to the microscope slide 31 was then peeled off, and a PET sheet ("Melinex (registered trademark) S" available from Teijin DuPont Films) 32 having a thickness of 125 μm was bonded to the surface of the optically clear adhesive sheet 12 on the side opposite to the microscope slide 31 as shown in FIG. 4A.

The sample was then left at normal temperature and normal humidity (temperature: 23° C., humidity: 50%) for 12 hours. Subsequently, the adhesive strength of the optically clear adhesive sheet 12 to the microscope slide 31 was measured by pulling the PET sheet 32 in a 180° direction as shown in FIG. 4B such that the optically clear adhesive sheet 12 was separated from the microscope slide 31 at the interface therebetween. In each of the examples and comparative examples, two samples were prepared for the measurement. The average of the obtained two measurement values was used as the measurement result in each of the examples and comparative examples.

TABLE 1

| | | | Example A-1 | Example A-2 | Example A-3 | Example A-4 |
|---|---|---|---|---|---|---|
| Composition | | | | | | |
| (1) Polyol component | | Product name | EPOL | EPOL | EPOL | EPOL |
| | | Amount (parts by weight) | 100 | 100 | 100 | 100 |
| (2) Polyisocyanate component | | Product name | Desmodur I | Desmodur I | Desmodur I | Desmodur I |
| | | Amount (parts by weight) | 11.7 | 7.0 | 5.8 | 11.3 |
| (3) Tackifier masterbatch | | Product name | CLEARON P85 | — | — | — |
| | | Amount (parts by weight) | 33.3 | — | — | — |
| (4) Plasticizer | | Product name | — | — | — | OFH55 |
| | | Amount (parts by weight) | — | — | — | 18.0 |
| (5) Catalyst | | Product name | UL-28 | UL-28 | UL-28 | UL-28 |
| | | Amount (parts by weight) | 0.05 | 0.01 | 0.01 | 0.03 |
| α Ratio | | | 1.3 | 1.5 | 1.8 | 0.95 |
| Sheet thickness (μm) | | | 300 | 300 | 300 | 300 |
| Evaluation items | | | | | | |
| Micro rubber hardness (type A) (°) | | | 22.5 | 4.4 | 0.2 | 26.6 |
| Optical characteristics | Haze (%) | | 0.52 | 0.05 | 0.14 | 0.33 |
| | Total light transmittance (%) | | 92.02 | 92.07 | 91.72 | 91.45 |
| Initial air bubbles after vacuum bonding | | | Absent | Absent | Absent | Absent |
| Durability (high temperature and normal humidity) | Generation of air bubbles | | Absent | Absent | Absent | Absent |
| | Changes in sheet shape | | Absent | Absent | Absent | Absent |
| Adhesive strength at normal temperature (N/25 mm) | | | — | — | — | 0.25 |

| | | | Example A-5 | Example A-6 | Example A-7 |
|---|---|---|---|---|---|
| Composition | | | | | |
| (1) Polyol component | | Product name | EPOL | EPOL | EPOL |
| | | Amount (parts by weight) | 100 | 100 | 100 |
| (2) Polyisocyanate component | | Product name | Desmodur I | Desmodur I | Desmodur I |
| | | Amount (parts by weight) | 8.3 | 11.3 | 8.3 |
| (3) Tackifier masterbatch | | Product name | — | — | — |
| | | Amount (parts by weight) | — | — | — |

TABLE 1-continued

|  |  |  |  |  |
|---|---|---|---|---|
| (4) Plasticizer | Product name | OFH55 | MORESCO HILUBE LB-100 | MORESCO HILUBE LB-100 |
|  | Amount (parts by weight) | 46.3 | 90.1 | 92.6 |
| (5) Catalyst | Product name | UL-28 | UL-28 | UL-28 |
|  | Amount (parts by weight) | 0.03 | 0.16 | 0.16 |
|  | α Ratio | 1.3 | 0.95 | 1.3 |
|  | Sheet thickness (μm) | 300 | 300 | 300 |
|  | Evaluation items |  |  |  |
|  | Micro rubber hardness (type A) (°) | 5.2 | 9.6 | 2.9 |
| Optical characteristics | Haze (%) | 0.65 | 0.26 | 0.36 |
|  | Total light transmittance (%) | 92.04 | 91.61 | 91.42 |
|  | Initial air bubbles after vacuum bonding | Absent | Absent | Absent |
| Durability (high temperature | Generation of air bubbles | Absent | Absent | Absent |
| and normal humidity) | Changes in sheet shape | Absent | Absent | Absent |
|  | Adhesive strength at normal temperature (N/25 mm) | 0.4 | — | 0.7 |

TABLE 2

|  |  | Example A-8 | Example A-9 | Example A-10 | Example A-11 |
|---|---|---|---|---|---|
|  | Composition |  |  |  |  |
| (1) Polyol component | Product name | EPOL | EPOL | EPOL | EPOL |
|  | Amount (parts by weight) | 100 | 100 | 100 | 100 |
| (2) Polyisocyanate component | Product name | Desmodur I | Desmodur I | Desmodur I | Desmodur I |
|  | Amount (parts by weight) | 17.4 | 12.5 | 12.5 | 19.6 |
| (3) Tackifier masterbatch | Product name | CLEARON P85 | CLEARON P85 | CLEARON P85 | CLEARON P85 |
|  | Amount (parts by weight) | 33.3 | 33.3 | 33.3 | 60.0 |
| (4) Plasticizer | Product name | MORESCO HILUBE LB-100 | MORESCO HILUBE LB-100 | Durasyn148 | SANSO CIZER DUP |
|  | Amount (parts by weight) | 42.8 | 43.9 | 43.9 | 37.6 |
| (5) Catalyst | Product name | UL-28 | UL-28 | UL-28 | UL-28 |
|  | Amount (parts by weight) | 0.12 | 0.12 | 0.12 | 0.09 |
|  | α Ratio | 0.95 | 1.3 | 1.3 | 1.3 |
|  | Sheet thickness (μm) | 300 | 300 | 300 | 300 |
|  | Evaluation items |  |  |  |  |
|  | Micro rubber hardness (type A) (°) | 16.7 | 5.2 | 5.5 | 6.7 |
| Optical characteristics | Haze (%) | 0.37 | 0.36 | 0.39 | 0.34 |
|  | Total light transmittance (%) | 91.86 | 91.55 | 91.16 | 92.02 |
|  | Initial air bubbles after vacuum bonding | Absent | Absent | Absent | Absent |
| Durability (high temperature | Generation of air bubbles | Absent | Absent | Absent | Absent |
| and normal humidity) | Changes in sheet shape | Absent | Absent | Absent | Absent |
|  | Adhesive strength at normal temperature (N/25 mm) | — | 0.7 | 1.2 | 0.4 |

|  |  | Example A-12 | Example A-13 | Example A-14 |
|---|---|---|---|---|
|  | Composition |  |  |  |
| (1) Polyol component | Product name | EPOL | EPOL | EPOL |
|  | Amount (parts by weight) | 100 | 100 | 100 |
| (2) Polyisocyanate component | Product name | Desmodur I | Desmodur I | Desmodur I |
|  | Amount (parts by weight) | 13.9 | 13.9 | 19.6 |
| (3) Tackifier masterbatch | Product name | CLEARON P85 | I-MARV P-100 | I-MARV P-100 |
|  | Amount (parts by weight) | 33.3 | 33.3 | 60.0 |
| (4) Plasticizer | Product name | Adekacizer C-9N | Adekacizer C-9N | Adekacizer C-9N |
|  | Amount (parts by weight) | 18.4 | 18.4 | 18.8 |
| (5) Catalyst | Product name | UL-28 | UL-28 | UL-28 |
|  | Amount (parts by weight) | 0.05 | 0.05 | 0.09 |
|  | α Ratio | 1.1 | 1.1 | 1.3 |
|  | Sheet thickness (μm) | 300 | 300 | 300 |
|  | Evaluation items |  |  |  |
|  | Micro rubber hardness (type A) (°) | 21.9 | 21 | 9 |
| Optical characteristics | Haze (%) | 0.49 | 0.48 | 0.39 |
|  | Total light transmittance (%) | 92.04 | 91.7 | 91.62 |
|  | Initial air bubbles after vacuum bonding | Absent | Absent | Absent |
| Durability (high temperature | Generation of air bubbles | Absent | Absent | Absent |
| and normal humidity) | Changes in sheet shape | Absent | Absent | Absent |
|  | Adhesive strength at normal temperature (N/25 mm) | 0.2 | 0.15 | 0.65 |

TABLE 3

|  |  | Example A-15 | Example A-16 | Example A-17 | Example A-18 |
|---|---|---|---|---|---|
| Composition | | | | | |
| (1) Polyol component | Product name | EPOL | EPOL | EPOL | EPOL |
|  | Amount (parts by weight) | 100 | 100 | 100 | 100 |
| (2) Polyisocyanate component | Product name | Desmodur I | Desmodur I | Desmodur I | Desmodur I |
|  | Amount (parts by weight) | 11.4 | 11.4 | 17.4 | 17.4 |
| (3) Tackifier masterbatch | Product name | I-MARV P-100 | I-MARV P-100 | I-MARV P-100 | I-MARV P-100 |
|  | Amount (parts by weight) | 33.3 | 33.3 | 33.3 | 33.3 |
| (4) Plasticizer | Product name | OFH55 | Durasyn148 | MORESCO HILUBE LB-100 | MORESCO HILUBE LB-100 |
|  | Amount (parts by weight) | 43.9 | 43.9 | 42.8 | 42.8 |
| (5) Catalyst | Product name | UL-28 | UL-28 | UL-28 | UL-28 |
|  | Amount (parts by weight) | 0.02 | 0.02 | 0.12 | 0.12 |
| α Ratio | | 1.3 | 1.3 | 0.95 | 0.95 |
| Sheet thickness (μm) | | 300 | 300 | 300 | 2000 |
| Evaluation items | | | | | |
| Micro rubber hardness (type A) (°) | | 4.1 | 6.8 | 17.2 | 5.2 |
| Optical characteristics | Haze (%) | 0.24 | 0.25 | 0.34 | 0.36 |
|  | Total light transmittance (%) | 91.38 | 92 | 92.01 | 92.16 |
| Initial air bubbles after vacuum bonding | | Absent | Absent | Absent | Absent |
| Durability (high temperature and normal humidity) | Generation of air bubbles | Absent | Absent | Absent | Absent |
|  | Changes in sheet shape | Absent | Absent | Absent | Absent |
| Adhesive strength at normal temperature (N/25 mm) | | 0.1 | 1.2 | — | — |

|  |  | Comparative Example A-1 | Comparative Example A-2 | Comparative Example A-3 |
|---|---|---|---|---|
| Composition | | | | |
| (1) Polyol component | Product name | L34 | Pandex GCB-41 | L34 |
|  | Amount (parts by weight) | 100 | 100 | 100 |
| (2) Polyisocyanate component | Product name | HDI-based A | Pandex GCA-11 | Desmodur I |
|  | Amount (parts by weight) | 73.9 | 17.6 | 52.6 |
| (3) Tackifier masterbatch | Product name | — | — | I-MARV P-100 |
|  | Amount (parts by weight) | — | — | 76.7 |
| (4) Plasticizer | Product name | — | SANSO CIZER DOS | — |
|  | Amount (parts by weight) | — | 40 | — |
| (5) Catalyst | Product name | UL-28 | UL-28 | UL-28 |
|  | Amount (parts by weight) | 0.03 | 0.03 | 0.01 |
| α Ratio | | 1.3 | 1.25 | 1.3 |
| Sheet thickness (μm) | | 300 | 300 | 300 |
| Evaluation items | | | | |
| Micro rubber hardness (type A) (°) | | 19 | 20 | 17.9 |
| Optical characteristics | Haze (%) | 0.17 | 0.43 | 0.43 |
|  | Total light transmittance (%) | 91.99 | 91.69 | 91.92 |
| Initial air bubbles after vacuum bonding | | Absent | Absent | Absent |
| Durability (high temperature and normal humidity) | Generation of air bubbles | Present | Present | Present |
|  | Changes in sheet shape | Absent | Present | Absent |
| Adhesive strength at normal temperature (N/25 mm) | | — | — | — |

"HDI-based A" represents "HDI-based polyisocyanate A".

As is clear from Tables 1 to 3, the optically clear adhesive sheets of Examples A-1 to A-18 each exhibited good results in all evaluation items. In contrast, the optically clear adhesive sheets of Comparative Examples A-1 and A-3 obtained by adding a polycarbonate polyol instead of a polyolefin polyol as the polyol component were observed to generate air bubbles at high temperature and normal humidity. The optically clear adhesive sheet of Comparative Example A-2 obtained by adding a polyether polyol instead of a polyolefin polyol as the polyol component was also observed to generate air bubbles and changes in sheet shape at high temperature and normal humidity.

<In the case where polyisocyanate component is specific modified polyisocyanate (B)>

Example B-1

First, a solid hydrogenated petroleum resin-based tackifier (I-MARV P-100) was added to a polyolefin polyol (EPOL) whose temperature was controlled to 100° C. to 150° C., and the mixture was stirred so that a masterbatch containing a tackifier dissolved in a polyolefin polyol was obtained. Here, the tackifier content in the masterbatch was adjusted to 30 wt %. Then, a polyolefin polyol (EPOL) (100 parts by weight), the HDI-based polyisocyanate B (36.5 parts by weight), the tackifier masterbatch (186.9 parts by weight), and a catalyst (dimethyltin dilaurate) (0.02 parts by weight) were mixed with stirring using an oscillating model agitator "Ajiter". Thus, a heat-curable polyurethane composition was prepared.

Subsequently, the obtained heat-curable polyurethane composition was fed into the molding machine 20 shown in FIG. 2. The heat-curable polyurethane composition was crosslinked and cured at a furnace temperature of 50° C. to 90° C. for a furnace time of several minutes while being transported in the state of being sandwiched between the paired release liners (PET films with release-treated surfaces) 21, and thereby a sheet with the release liners 21 was obtained. Subsequently, the sheet was crosslinked in the heating machine 24 for 10 to 15 hours, so that the optically clear adhesive sheet 12 having the release liner 21 on each surface and formed of a cured product of a heat-curable polyurethane composition was produced. The optically clear adhesive sheet 12 had a thickness of 300 μm.

Examples B-2 to B-6 and Comparative Examples B-1 to B-2

Optically clear adhesive sheets with release liners according to Examples B-2 to B-6 and Comparative Examples B-1 to B-2 were produced as in Example B-1, except that the composition was changed as shown in the following Table 4.

hardness (type A) measurement; (2) optical characteristics evaluation; and (5) adhesive strength evaluation, by the above-described methods; and (6) durability by the following method. The results are shown in Table 5.

(6) Durability Evaluation

One of the release liners of each optically clear adhesive sheet with release liners was peeled off, and the exposed optically clear adhesive sheet of the sample was bonded to a microscope slide (made of soda-lime glass). The members were retained in this state at a pressure of 0.4 MPa for 30 minutes, so that the optically clear adhesive sheet and the microscope slide were bonded to each other. The other release liner on the side opposite to the microscope slide was then peeled off. The resulting samples were left, one at high

TABLE 4

| Composition | | Example B-1 | Example B-2 | Example B-3 | Example B-4 | Example B-5 |
|---|---|---|---|---|---|---|
| (1) Polyol component | Product name | EPOL | EPOL | EPOL | EPOL | EPOL |
| | Amount (parts by weight) | 100 | 100 | 100 | 100 | 100 |
| (2) Polyisocyanate component | Product name | HDI-based B | HDI-based B | HDI-based B | HDI-based B | HDI-based C |
| | Amount (parts by weight) | 36.5 | 36.5 | 34.3 | 49.2 | 49.2 |
| (3) Tackifier masterbatch | Product name | I-MARV P-100 | I-MARV P-100 | I-MARV P-100 | I-MARV P-100 | I-MARV P-100 |
| | Amount (parts by weight) | 186.9 | 186.9 | 195.7 | 151.6 | 151.6 |
| (4) Plasticizer | Product name | — | OFH55 | OFH55 | SANSO CIZER DUP | SANSO CIZER DUP |
| | Amount (parts by weight) | — | 57.4 | 29.6 | 118.3 | 118.3 |
| (5) Catalyst | Product name | UL-28 | UL-28 | UL-28 | UL-28 | UL-28 |
| | Amount (parts by weight) | 0.02 | 0.02 | 0.02 | 0.06 | 0.06 |
| α Ratio | | 1.7 | 1.7 | 1.8 | 1.3 | 1.3 |

| Composition | | Example B-6 | Comparative Example B-1 | Comparative Example B-2 |
|---|---|---|---|---|
| (1) Polyol component | Product name | EPOL | L34 | L34 |
| | Amount (parts by weight) | 100 | 100 | 100 |
| (2) Polyisocyanate component | Product name | HDI-based C | HDI-based A | HDI-based B |
| | Amount (parts by weight) | 49.2 | 170.6 | 125.6 |
| (3) Tackifier masterbatch | Product name | I-MARV P-100 | KE-601 | — |
| | Amount (parts by weight) | 151.6 | 41.6 | — |
| (4) Plasticizer | Product name | DINCH | — | — |
| | Amount (parts by weight) | 118.3 | — | — |
| (5) Catalyst | Product name | UL-28 | UL-28 | UL-28 |
| | Amount (parts by weight) | 0.06 | 0.12 | 0.09 |
| α Ratio | | 1.3 | 1.4 | 1.4 |

"HDI-based B" represents "HDI-based polyisocyanate B", and "HDI-based C" represents "HDI-based polyisocyanate C".

(Evaluation on Optically Clear Adhesive Sheet)

The optically clear adhesive sheets with release liners produced in Examples B-1 to B-6 and Comparative Examples B-1 to B-2 were subjected to (1) micro rubber temperature and normal humidity (95° C.) and the other at high temperature and high humidity (85° C., 85%), each for 168 hours. Thereafter, the optically clear adhesive sheets were visually observed. Here, in the high temperature and normal humidity conditions, the temperature was set to 95° C. using a convection oven, but the humidity was not controlled.

TABLE 5

| Evaluation items | | Example B-1 | Example B-2 | Example B-3 | Example B-4 | Example B-5 | Example B-6 | Comparative Example B-1 | Comparative Example B-2 |
|---|---|---|---|---|---|---|---|---|---|
| Micro rubber hardness (type A) (°) | | 9.2 | 3.1 | 2.8 | 8.6 | 9.4 | 10 | 11.5 | 3.9 |
| Optical characteristics | Haze (%) | 0.31 | 0.22 | 0.2 | 0.48 | 0.23 | 0.62 | 0.30 | 0.11 |
| | Total light transmittance (%) | 91.5 | 91.5 | 91.6 | 91.5 | 92.0 | 91.6 | 92.1 | 91.4 |
| Durability | Appearance changes at high temperature and normal humidity | Absent | Absent | Absent | Absent | Absent | Absent | Air bubbles generated | Air bubbles generated |
| | Appearance changes at high temperature and high humidity | Absent | Absent | Absent | Absent | Absent | Absent | Air bubbles generated | Air bubbles generated |

TABLE 5-continued

| Evaluation items | Example B-1 | Example B-2 | Example B-3 | Example B-4 | Example B-5 | Example B-6 | Comparative Example B-1 | Comparative Example B-2 |
|---|---|---|---|---|---|---|---|---|
| Changes in sheet shape at high temperature and high humidity | Absent | Absent | Absent | Absent | Absent | Absent | Absent | Absent |
| Adhesive strength at normal temperature (N/25 mm) | 8.5 | 3.1 | 6.3 | 0.2 | 0.1 | 0.1 | 12.8 | 8.4 |

As is clear from Table 4 and Table 5, the optically clear adhesive sheets of Examples B-1 to B-6 each exhibited good results in all evaluation items. In contrast, the optically clear adhesive sheets of Comparative Examples B-1 and B-2 obtained by adding a polycarbonate polyol instead of a polyolefin polyol as the polyol component were observed to generate air bubbles at high temperature and normal humidity and also at high temperature and high humidity.

<In the Case where the Isophorone Diisocyanate-Based Polyisocyanate (A) and the Specific Modified Polyisocyanate (B) are Used in Combination as Polyisocyanate Components>

Example C-1

First, a solid hydrogenated petroleum resin-based tackifier (I-MARV P-100) was added to a polyolefin polyol (EPOL) whose temperature was controlled to 100° C. to 150° C., and the mixture was stirred so that a masterbatch containing a tackifier dissolved in a polyolefin polyol was obtained. Here, the tackifier content in the masterbatch was adjusted to 30 wt %. Then, a polyolefin polyol (EPOL) (100 parts by weight), an IPDI-based polyisocyanate (Desmodur I) (25.9 parts by weight), the HDI-based polyisocyanate B (6.5 parts by weight), the tackifier masterbatch (200.49 parts by weight), and a catalyst (dimethyltin dilaurate) (0.02 parts by weight) were mixed with stirring using an oscillating model agitator "Ajiter". Thus, a heat-curable polyurethane composition was prepared.

Subsequently, the obtained heat-curable polyurethane composition was fed into the molding machine 20 shown in FIG. 2. The heat-curable polyurethane composition was crosslinked and cured at a furnace temperature of 50° C. to 90° C. for a furnace time of several minutes while being transported in the state of being sandwiched between the paired release liners (PET films with release-treated surfaces) 21, and thereby a sheet with the release liners 21 was obtained. Subsequently, the sheet was crosslinked in the heating machine 24 for 10 to 15 hours, so that the optically clear adhesive sheet 12 having the release liner 21 on each surface and formed of a cured product of a heat-curable polyurethane composition (optically clear adhesive sheet with release liners) was produced. The optically clear adhesive sheet 12 had a thickness of 300 μm.

(Evaluation on Optically Clear Adhesive Sheet)

The optically clear adhesive sheet with release liners produced in Example C-1 was subjected to (1) micro rubber hardness (type A) measurement; (2) optical characteristics evaluation; (3) checking for initial air bubbles after vacuum bonding; and (4) checking for air bubbles and changes in sheet shape at high temperature and normal humidity, by the methods described above. The results are shown in Table 6.

TABLE 6

| | | Example C-1 | |
|---|---|---|---|
| Composition | | | |
| (1) Polyol component | Product name | EPOL | |
| | Amount (parts by weight) | 100 | |
| (2) Polyisocyanate component | Product name | Desmodur I | HDI-based B |
| | Amount (parts by weight) | 25.9 | 6.5 |
| (3) Tackifier masterbatch | Product name | I-MARV P-100 | |
| | Amount (parts by weight) | 200.49 | |
| (4) Plasticizer | Product name | — | |
| | Amount (parts by weight) | — | |
| (5) Catalyst | Product name | UL-28 | |
| | Amount (parts by weight) | 0.02 | |
| | α Ratio | 1.7 | |
| | Sheet thickness (μm) | 300 | |
| Evaluation items | | | |
| Micro rubber hardness (type A) (°) | | 11 | |
| Optical characteristics | Haze (%) | 0.39 | |
| | Total light transmittance (%) | 91.57 | |
| Initial air bubbles after vacuum bonding | | Absent | |
| Durability (high temperature and normal humidity) | Generation of air bubbles | Absent | |
| | Changes in sheet shape | Absent | |

As is clear from Table 6, the optically clear adhesive sheet of Example C-1 exhibited good results in all evaluation items.

<In the case where the polyisocyanate component is hexamethylene diisocyanate-based polyisocyanate (D)>

Example D-1

First, a solid tackifier (I-MARV P-100) was added to a polyolefin polyol (EPOL) whose temperature was controlled to 100° C. to 150° C., and the mixture was stirred so that a masterbatch containing a tackifier dissolved in a polyolefin polyol was obtained. Here, the tackifier content in the masterbatch was adjusted to 30 wt %. Then, a polyolefin polyol (EPOL) (100 parts by weight), an HDI-based polyisocyanate (8.5 parts by weight), the tackifier masterbatch (54.7 parts by weight), and a catalyst (dimethyltin dilaurate) (0.01 parts by weight) were mixed with stirring using an oscillating model agitator "Ajiter". Thus, a heat-curable polyurethane composition was prepared.

Subsequently, the obtained heat-curable polyurethane composition was fed into the molding machine 20 shown in FIG. 2. The heat-curable polyurethane composition was crosslinked and cured at a furnace temperature of 50° C. to 90° C. for a furnace time of several minutes while being transported in the state of being sandwiched between the paired release liners (PET films with release-treated surfaces) 21, and thereby a sheet with the release liners 21 was obtained. Subsequently, the sheet was crosslinked in the heating machine 24 for 10 to 15 hours, so that the optically clear adhesive sheet 12 having the release liner 21 on each surface and formed of a cured product of a heat-curable polyurethane composition (optically clear adhesive sheet with release liners) was produced. The optically clear adhesive sheet 12 had a thickness of 300 μm.

Examples D-2 to D-8

Optically clear adhesive sheet with release liners according to Examples D-2 to D-8 were produced as in Example D-1, except that the composition was changed as shown in the following Table 7.
(Evaluation on Optically Clear Adhesive Sheet)

The optically clear adhesive sheets with release liners produced in Examples D-1 to D-8 were subjected to (1) micro rubber hardness (type A) measurement; (2) optical characteristics evaluation; (3) checking for initial air bubbles after vacuum bonding; and (4) checking for air bubbles and changes in sheet shape at high temperature and normal humidity. The results are shown in Table 7.

TABLE 7

| | | Example D-1 | Example D-2 | Example D-3 | Example D-4 |
|---|---|---|---|---|---|
| Composition | | | | | |
| (1) Polyol component | Product name | EPOL | EPOL | EPOL | EPOL |
| | Amount (parts by weight) | 100 | 100 | 100 | 100 |
| (2) Polyisocyanate component | Material name | HDI | HDI | HDI | HDI |
| | Amount (parts by weight) | 8.5 | 7.4 | 6.2 | 5.3 |
| (3) Tackifier masterbatch | Product name | I-MARV P-100 | I-MARV P-100 | — | — |
| | Amount (parts by weight) | 54.7 | 66.7 | — | — |
| (4) Plasticizer | Product name | — | — | OFH55 | OFH55 |
| | Amount (parts by weight) | — | — | 10 | 10 |
| (5) Catalyst | Product name | UL-28 | UL-28 | UL-28 | UL-28 |
| | Amount (parts by weight) | 0.01 | 0.01 | 0.01 | 0.01 |
| α Ratio | | 1.3 | 1.5 | 1.3 | 1.5 |
| Sheet thickness (μm) | | 300 | 300 | 300 | 300 |
| Evaluation items | | | | | |
| Micro rubber hardness (type A) (°) | | 12.4 | 2.1 | 10.4 | 1.3 |
| Optical characteristics | Haze (%) | 0.31 | 0.24 | 0.26 | 0.38 |
| | Total light transmittance (%) | 92.01 | 91.47 | 91.58 | 91.24 |
| Initial air bubbles after vacuum bonding | | Absent | Absent | Absent | Absent |
| Durability (high temperature and normal humidity) | Generation of air bubbles | Absent | Absent | Absent | Absent |
| | Changes in sheet shape | Absent | Absent | Absent | Absent |

| | | Example D-5 | Example D-6 | Example D-7 | Example D-8 |
|---|---|---|---|---|---|
| Composition | | | | | |
| (1) Polyol component | Product name | EPOL | EPOL | EPOL | EPOL |
| | Amount (parts by weight) | 100 | 100 | 100 | 100 |
| (2) Polyisocyanate component | Material name | HDI | HDI | HDI | HDI |
| | Amount (parts by weight) | 8.5 | 7.4 | 6.2 | 5.3 |
| (3) Tackifier masterbatch | Product name | I-MARV P-100 | I-MARV P-100 | — | — |
| | Amount (parts by weight) | 54.7 | 66.7 | — | — |
| (4) Plasticizer | Product name | OFH55 | OFH55 | — | — |
| | Amount (parts by weight) | 10 | 10 | — | — |
| (5) Catalyst | Product name | UL-28 | UL-28 | UL-28 | UL-28 |
| | Amount (parts by weight) | 0.01 | 0.01 | 0.01 | 0.01 |
| α Ratio | | 1.3 | 1.5 | 1.3 | 1.5 |
| Sheet thickness (μm) | | 300 | 300 | 300 | 300 |
| Evaluation items | | | | | |
| Micro rubber hardness (type A) (°) | | 8.1 | 0.8 | 15.6 | 3.5 |
| Optical characteristics | Haze (%) | 0.41 | 0.33 | 0.15 | 0.22 |
| | Total light transmittance (%) | 91.68 | 92.04 | 91.81 | 91.56 |
| Initial air bubbles after vacuum bonding | | Absent | Absent | Absent | Absent |
| Durability (high temperature and normal humidity) | Generation of air bubbles | Absent | Absent | Absent | Absent |
| | Changes in sheet shape | Absent | Absent | Absent | Absent |

As is clear from Table 7, each of the optically clear adhesive sheets of Examples D-1 to D-8 exhibited good results in all the evaluation items.

The invention claimed is:
1. An optically clear adhesive sheet consisting of:
a cured product of a heat-curable polyurethane composition,
the heat-curable polyurethane composition containing a polyol component and a polyisocyanate component, wherein the heat-curable polyurethane composition does not contain an tackifier,
the polyol component consisting of a polyol having an olefin skeleton, wherein the polyol having an olefin skeleton is the only polyol component in the heat-curable polyurethane composition,
the polyisocyanate component containing at least one of an acyclic aliphatic polyisocyanate, an alicyclic polyisocyanate, a modified acyclic aliphatic polyisocyanate and a modified alicyclic polyisocyanate, wherein the modified acyclic aliphatic polyisocyanate is obtained by reacting an acyclic aliphatic polyisocyanate having an isocyanate group with an ether compound having an ethylene oxide unit, the modified alicyclic polyisocyanate is obtained by reacting an alicyclic polyisocyanate having an isocyanate group with an ether compound having an ethylene oxide unit, and wherein an α ratio (A/B) of the number of moles of OH groups (A) derived from the polyol component to the number of moles of NCO groups (B) derived from the polyisocyanate component is 1.3 to 1.8.

2. The optically clear adhesive sheet according to claim 1, wherein the acyclic aliphatic polyisocyanate is hexamethylene diisocyanate.

3. The optically clear adhesive sheet according to claim 1, wherein the heat-curable polyurethane composition further contains a plasticizer.

4. A laminate comprising:
the optically clear adhesive sheet according to claim 1;
a first release liner covering one surface of the optically clear adhesive sheet; and
a second release liner covering the other surface of the optically clear adhesive sheet.

5. A method for producing the laminate according to claim 4 comprising the steps of:
mixing the polyol component and the polyisocyanate component under stirring; and
pouring a liquid obtained by the mixing under stirring between he first release liner and the second release liner to cure the liquid.

6. A display device with a touchscreen comprising:
the optically clear adhesive sheet according to claim 1;
a display panel; and
a touchscreen.

7. The optically clear adhesive sheet according to claim 1, wherein the alicyclic polyisocyanate is isophorone diisocyanate.

* * * * *